US011719591B2

(12) United States Patent
Regef et al.

(10) Patent No.: US 11,719,591 B2
(45) Date of Patent: Aug. 8, 2023

(54) METHOD FOR DETECTING LEAKAGE OF A HOLLOW COMPONENT AND INSTALLATION FOR IMPLEMENTING SUCH A METHOD

(71) Applicant: ATEQ, Les Clayes Sous Bois (FR)

(72) Inventors: Jean Luc Regef, Taipei (TW); Brian Bright, Ontario (CA); Youri Dolgorouky, Orsay (FR)

(73) Assignee: ATEQ, Les Clayes sous Bois (FR)

(*) Notice: Subject to any disclaimer, the term of this patent is extended or adjusted under 35 U.S.C. 154(b) by 587 days.

(21) Appl. No.: 16/628,318

(22) PCT Filed: Jul. 6, 2018

(86) PCT No.: PCT/EP2018/068433
§ 371 (c)(1),
(2) Date: Apr. 3, 2020

(87) PCT Pub. No.: WO2019/008169
PCT Pub. Date: Jan. 10, 2019

(65) Prior Publication Data
US 2020/0240868 A1 Jul. 30, 2020

(30) Foreign Application Priority Data

Jul. 6, 2017 (FR) ........................................ 1756387
Oct. 30, 2017 (FR) ........................................ 1760250

(51) Int. Cl.
*G01M 3/22* (2006.01)
*G01M 3/20* (2006.01)
*G01M 3/32* (2006.01)

(52) U.S. Cl.
CPC ............ *G01M 3/229* (2013.01); *G01M 3/205* (2013.01); *G01M 3/207* (2013.01); *G01M 3/224* (2013.01); *G01M 3/3272* (2013.01)

(58) Field of Classification Search
CPC ........ G01M 3/20; G01M 3/229; G01M 3/228; G01M 3/227; G01M 3/329; G01M 3/3281; G01M 3/34; G01M 3/3263; G01M 3/3218
See application file for complete search history.

(56) References Cited

U.S. PATENT DOCUMENTS 3,355,932 A 12/1967 Mulligan
3,577,769 A * 5/1971 Roberts ................. G01M 3/229
73/40.7

(Continued)

FOREIGN PATENT DOCUMENTS

DE 43 35 894 A1 4/1995
DE 69623171 T2 4/2003

(Continued)

OTHER PUBLICATIONS

Intitut national de recherche et de securite, Edition INRS ED 6088, Detecteurs portables de gaz et de vapeurs; ED6088 Aide-Memoire Technique, pp. 1-15.

*Primary Examiner* — David A. Rogers
(74) *Attorney, Agent, or Firm* — Young Basile Hanlon & MacFarlane, P.C.

(57) ABSTRACT

The invention relates to a method for detecting leakage of a hollow component, comprising the steps of sealing said hollow component (1, 31), creating a pressure difference P1 and P2 between said hollow component interior and an adjacent compartment/enclosure (2, 32), putting a tracer gas in one of the hollow component or said compartment/ enclosure, waiting for an enriching time T and then carrying out a step of transferring, via a non-selective or selective restriction (6, 7; 49), the content of said hollow component or said compartment/enclosure (2; 32) into which tracer gas has not been put, in order to concentrate, in a volume downstream of said restriction (6, 7; 49), the tracer gas that (Continued)

said content may possibly contain, and then in looking for the presence of tracer gas in said volume. The invention also relates to an installation for implementing the method.

12 Claims, 5 Drawing Sheets

(56) References Cited

U.S. PATENT DOCUMENTS

| | | | |
|---|---|---|---|
| 3,729,983 A * | 5/1973 | Coppens | G01M 3/229 73/40.7 |
| 3,762,212 A * | 10/1973 | Morley | G01M 3/202 376/250 |
| 4,282,744 A * | 8/1981 | Dick | G01M 3/186 73/49.3 |
| 4,686,851 A | 8/1987 | Holm et al. | |
| 4,893,497 A * | 1/1990 | Danielson | G01M 3/202 73/40.7 |
| 4,920,785 A * | 5/1990 | Etess | G01M 3/229 73/49.3 |
| 4,954,087 A | 9/1990 | Lauks et al. | |
| 5,111,137 A | 5/1992 | Heumann et al. | |
| 5,128,269 A * | 7/1992 | Oitate | G01R 31/1254 73/40.7 |
| 5,172,583 A * | 12/1992 | Tallon | G01M 3/202 73/40.7 |
| 5,206,097 A | 4/1993 | Burns et al. | |
| 5,361,626 A * | 11/1994 | Colligan | G01M 3/20 73/40.7 |
| 5,369,983 A * | 12/1994 | Grenfell | G01M 3/229 73/49.3 |
| 5,386,717 A * | 2/1995 | Toda | G01M 3/202 73/40.7 |
| 5,546,789 A | 8/1996 | Balke et al. | |
| 5,661,229 A | 8/1997 | Bohm et al. | |
| 5,795,995 A | 8/1998 | Shimaoka et al. | |
| 6,033,233 A | 3/2000 | Haseyama et al. | |
| 6,082,184 A | 7/2000 | Lehmann | |
| 6,119,507 A * | 9/2000 | Flosbach | G01M 3/205 73/40.7 |
| 6,272,902 B1 | 8/2001 | Chen et al. | |
| 6,530,264 B1 * | 3/2003 | Rink | G01M 3/227 73/40.7 |
| 6,626,027 B1 | 9/2003 | Davey | G01M 3/229 73/40.7 |
| 6,742,384 B2 * | 6/2004 | Avila | G01M 3/205 73/49.3 |
| 6,851,316 B2 * | 2/2005 | Micke | G01M 3/02 73/40 |
| 6,854,318 B2 * | 2/2005 | Sagi | G01M 3/3281 73/40 |
| 7,131,316 B2 | 11/2006 | Doehla et al. | |
| 7,210,337 B1 * | 5/2007 | Jarrett | G01M 3/3281 73/49.3 |
| 7,299,681 B2 * | 11/2007 | Cummings | G01M 3/229 73/40 |
| 7,448,256 B2 * | 11/2008 | Jenneus | G01M 3/226 73/49.2 |
| 7,559,231 B2 * | 7/2009 | Kanematsu | G01M 3/229 73/40.7 |
| 7,587,928 B2 * | 9/2009 | Kanematsu | G01M 3/202 73/40.7 |
| 7,779,675 B2 | 8/2010 | Wetzig et al. | |
| 7,905,132 B1 | 3/2011 | Chamberlain | |
| 8,806,919 B2 * | 8/2014 | Solomon | G01M 3/22 73/40.7 |
| 10,641,677 B2 * | 5/2020 | Minami | C25D 17/001 |
| 2002/0008534 A1 | 1/2002 | Yamazaki | |
| 2005/0151456 A1 | 7/2005 | Yoon et al. | |
| 2008/0018355 A1 | 1/2008 | Takekoshi et al. | |
| 2008/0202212 A1 | 8/2008 | Liepert | |
| 2009/0095095 A1 | 4/2009 | Hayashi et al. | |
| 2009/0100909 A1 * | 4/2009 | Grosse Bley | G01M 3/229 73/40.7 |
| 2009/0164148 A1 | 6/2009 | Shinoda | |
| 2009/0277249 A1 * | 11/2009 | Polster | G01M 3/229 73/40.7 |
| 2014/0239962 A1 | 8/2014 | Oda et al. | |
| 2016/0150690 P1 | 5/2016 | Bedard | |
| 2018/0026313 A1 | 1/2018 | Fukuoka et al. | |
| 2018/0202889 A1 * | 7/2018 | Perrissoud | G01M 3/226 |
| 2018/0328810 A1 | 11/2018 | Wetzig | |
| 2021/0396622 A1 * | 12/2021 | Bright | G01M 3/20 |

FOREIGN PATENT DOCUMENTS

| | | | |
|---|---|---|---|
| DE | 10 2012 214738 A1 | 2/2014 | |
| DE | 10 2014 205918 A1 | 10/2015 | |
| EP | 168972 A * | 1/1986 | G01M 3/229 |
| EP | 0 826 954 A2 | 3/1998 | |
| EP | 1214635 A1 | 6/2002 | |
| EP | 1467200 A1 | 10/2004 | |
| EP | 2270458 A1 | 1/2011 | |
| EP | 2672246 A1 | 12/2013 | |
| FR | 2283431 A1 | 3/1976 | |
| FR | 2558592 A1 | 7/1985 | |
| FR | 2 734053 A1 | 11/1996 | |
| FR | 2 971 501 A1 | 8/2012 | |
| GB | 2049954 A | 12/1980 | |
| GB | 2409724 A * | 7/2005 | G01M 3/226 |
| WO | 0104716 A1 | 1/2001 | |
| WO | 2011132391 A1 | 10/2011 | |
| WO | 2016/150690 A1 | 9/2016 | |
| WO | 2017012904 A1 | 1/2017 | |
| WO | 2019/053121 A1 | 3/2019 | |

* cited by examiner

METHOD FOR DETECTING LEAKAGE OF A HOLLOW COMPONENT AND INSTALLATION FOR IMPLEMENTING SUCH A METHOD

CROSS-REFERENCE TO RELATED APPLICATIONS

This application is a 35 USC 371 application claiming priority benefit to PCT/EP2018/068433 filed Jul. 6, 2018 which claims priority benefit to French application number 1756387 filed Jul. 6, 2017 and French application number 1760250 filed Oct. 30, 2017 the entire contents of all applications incorporated by reference in their entirety.

TECHNICAL FIELD

The invention relates to leakage detection in hollow industrial components, the sealing whereof must be inspected.

More specifically, the invention relates to the detection of such leakages implementing a tracer gas.

The invention is in particular applicable to the field of the manufacture of components intended for industry, such as the automotive industry, with a view to detecting leakages in various components, the operation whereof requires a perfect seal.

BACKGROUND

Some leakage detection techniques implementing a tracer gas consist of pressurising the interior of the component to be tested with such a gas, and of placing it in a chamber for detecting small quantities of gas that may have leaked from the component into this chamber. Conversely, other techniques consist of placing the component to be tested in a tracer gas-rich environment and of searching for the presence of this gas inside the component to be tested.

Thus, very small leakages are known to be detected in this way, by placing the interior of a component to be tested in a very high vacuum, then by detecting therein the tracer gas molecules that may have penetrated the component.

The American patent U.S. Pat. No. 5,661,229 thus describes the detection, in a measurement space, of helium passing through a quartz glass layer designed such that it only allows this gas to pass.

The patent application WO 2017012904 describes a method for checking the tightness of sealed products, also using helium as a tracer gas, according to which the helium concentration measurement is carried out using a mass spectrometer.

One drawback of these techniques is that they require the creation of a high vacuum, which increases the implementation costs thereof. More specifically, such a high vacuum requires the use of expensive material and heavy maintenance. The use of spectrometers also increases the costs.

Other techniques, which do not require the implementation of a high vacuum, consist of pressurising the component to be tested with tracer gas and of searching for the leakage using a "sniffer"-type detector. Such methods further allow the leakage to be located. However, with such techniques, the component is not tested as a whole, which leaves the possibility of not "sniffing" close enough to the leakage and of not detecting said leakage. Sometimes, the leakage point is simply inaccessible.

Other techniques, which also do not require the implementation of a high vacuum, consist of sealing the component to be tested, of placing it in an enclosure, of pressurising the component and of leaving the enclosure at atmospheric pressure, then of waiting long enough to be subsequently able to detect the potential presence of a tracer gas using a detector that is sensitive to this gas.

Such techniques, referred to as by accumulation, have the drawback of being long to implement, which can be incompatible with the production rates of the components to be tested.

Moreover, the concentration of tracer gas after accumulation can be too low to be detected by detectors commercially available.

There is thus a need for an alternative to the leakage detection methods of the prior art in order to reduce the implementation costs thereof, while reducing the detection time and allowing for the detection of very small leakages.

SUMMARY

The object of the invention is to propose a method for detecting a leakage that overcomes at least some of the aforementioned drawbacks of the prior art.

In particular, one object of the present invention is to describe such a method which does not require the implementation of a high vacuum.

Another object of the present invention is to propose a method which requires a shorter tracer gas detection time.

Yet another object of the invention is to propose a method which allows smaller leakages to be detected by the same commercially available tracer gas detector.

These and other objects that will appear hereafter are achieved by the invention, which relates to a method for detecting a leakage in a hollow component, comprising the steps of sealing said hollow component, of creating a difference in pressures P1 and P2 between the interior of said hollow component and a compartment or an enclosure, of injecting a tracer gas into the injection chamber formed by the interior of one of the hollow component and said compartment or said enclosure, of waiting an accumulation time T, then of carrying out a concentration step of at least partially sampling the contents of a control chamber formed by the interior of the other of said hollow component and said compartment or said enclosure into which no tracer gas has been injected, in order to concentrate, in a sample volume, the tracer gas that said contents of the control chamber potentially contain, then of looking for the presence of tracer gas in said sample volume.

According to one preferred embodiment of the invention, sampling is carried out by means of a sequence of expansion then re-compression comprising a first sub-step of expanding the contents of the control chamber in order to feed a concentration chamber with a sample volume, followed by a second sub-step of re-compressing the sample volume in order to ensure the concentration thereof before the step of searching for the presence of tracer gas within said sample volume.

According to one alternative embodiment, the method comprises a plurality of sequences for expanding then re-compressing the contents of the control chamber, comprising at least two consecutive iterations of said sequence. The object of these sequence reiterations is to ensure mixing and homogenisation of the control volume in order to increase the reliability of the tracer gas measurement.

The method of the invention further covers other modes for mixing the contents of the control chamber so as to prevent any stationary zone inside said chamber, using means belonging to the group comprising:

means for the flash expansion and/or re-compression (i.e. designed to cause a turbulence effect for example) of the contents of the control chamber;

dynamic mixing means formed, for example, by means such as an internal fan and/or a turbine external to said chamber;

static mixing means formed by a conformation of the internal surface of said chamber, which causes gas streams to be mixed during natural or forced gas movements (suction or compression, pumping, fan; turbine, etc.).

Advantageously, according to a first embodiment principle, the step of searching for tracer gas is carried out in a detection chamber located downstream of the concentration chamber, the communication circuit between the concentration chamber and the detection chamber comprising a restrictor.

According to a second embodiment principal, the communication circuit between the concentration chamber and the detection chamber comprises a membrane filtering unit.

According to this second embodiment principle, the invention thus provides for the accumulation, during a time T, of the tracer gas that has potentially leaked from or into the component to be tested, then for concentrating same by membrane filtering before searching for same using a suitable detector.

The method of the invention can further be applied by carrying out the step of searching for tracer gas in the concentration chamber itself using a gas detector placed in contact with the detection volume.

Such a concentration step, regardless of whether it falls within the scope of the first or second embodiment principles, allows very small leakages to be detected. More specifically, detection of the tracer gas is, according to the invention, not carried out on crude contents, but instead on concentrated contents. In the event of a very small leakage and in the absence of any very high vacuum in the adjacent compartment, the quantity of leaking tracer gas is fractional, and failing such a concentration, is possibly undetectable unless complex and expensive detectors are implemented such as spectrometers. Moreover, such a result is obtained without the need to implement a high vacuum involving the use of complex and expensive material as regards the acquisition and maintenance thereof. The invention thus proposes a very beneficial alternative to the leakage detection methods of the prior art.

This method can be implemented according to at least two preferred alternative embodiments.

These two alternative embodiments are described hereinbelow in relation to the second embodiment principle (use of a filtering membrane), however they can also each be used mutatis mutandis according to the first embodiment principle (without a membrane).

Thus, according to a first alternative embodiment, the hollow component to be tested has a compartment A and a compartment B adjacent to compartment A. The method according to the invention thus comprises the steps of pressurising, at a pressure P1, a tracer gas within one of said compartment A and said adjacent compartment B after having sealed same, of pressurising, at a pressure P2<P1, a gas that is different to the tracer gas within the other of said compartment A and said adjacent compartment B, of waiting an accumulation time T, and of filtering, through at least one membrane, the contents of one of compartment A or compartment B into which tracer gas was not injected, so as to concentrate, in a volume downstream of said membrane, the tracer gas potentially contained in compartment A or compartment B into which tracer gas was not injected.

According to a second alternative embodiment, capable in particular of being used when the component to be tested does not have two adjacent compartments, the method comprises the steps of placing said previously sealed hollow component in a compartment forming an enclosure, of pressurising, at a pressure P1, a tracer gas within one of said hollow component and said enclosure, of pressurising, at a pressure P2<P1, a gas that is different to the tracer gas within the other of said hollow component and said enclosure, of waiting a time T, and of filtering, through at least one membrane, the contents of said hollow component or of said enclosure into which tracer gas was not injected, so as to concentrate, in a volume downstream of said membrane, the tracer gas potentially contained in said hollow component or said enclosure into which tracer gas was not injected.

This second alternative embodiment could itself be implemented according to two alternative sub-embodiments.

According to one alternative sub-embodiment, the method comprises the successive steps of placing said hollow component in a compartment forming an enclosure, of pressurising, at a pressure P1, said tracer gas within said hollow component, of pressurising, at a pressure P2<P1, said other gas within said enclosure, of waiting a time T, of filtering, through a membrane, the contents of said enclosure and of searching for the presence of tracer gas downstream of said membrane.

According to another alternative sub-embodiment, the successive steps consist of placing said hollow component in a compartment forming an enclosure, of pressurising, at a pressure P1, said tracer gas within said enclosure, of pressurising, at a pressure P2<P1, said other gas within said hollow component, of waiting a time T, of filtering, through a membrane, the contents of said hollow component and of searching for the presence of tracer gas downstream of said membrane.

Regardless of the alternative embodiment or alternative sub-embodiment implemented, the tracer gas will preferably be selected from the group consisting of helium and a mixture of helium or hydrogen in air or nitrogen. The other gas is preferably air.

Also preferably, the pressure P1 lies in the range 1 bar to 40 bar. The pressure P2 can be equal to atmospheric pressure, however can advantageously also be less than atmospheric pressure.

The time T, which corresponds to the time during which the tracer gas can accumulate in the compartment into which it was not injected before being concentrated via the membrane, could in particular vary based on the size of the component to be tested, in particular that of the internal volume thereof, and of the leakage rate sought. In general, it preferably lies in the range 30 seconds to 30 minutes. This time, which can thus be quite short, can allow relatively high component inspection rates to be obtained.

According to one advantageous optional feature of the second embodiment principle, the enriching step of the method according to the invention is carried out through at least two membranes mounted in cascade, thus allowing the filtrate originating from a first membrane to be filtered through a second membrane. Such an optional feature allows the molecules of tracer gas to be further concentrated for the detection thereof.

Different types of commercially available membranes could be implemented within the scope of the method according to the invention. However, preferably, said membranes are selected from the group consisting of polymer membranes and membranes with a microporous silica base.

Within the scope of implementing the invention according to the first embodiment principle with a non-selective restrictor, different types of commercially available non-selective restrictors can be implemented provided that they allow the sought-after effect to be obtained, i.e. the creation and maintenance of a sufficient pressure difference for a sufficient time to allow for detection and/or measurement of tracer gas by a suitable detector. Typically, the restrictor is formed by a duct with a port, sized so as to form a head loss within the circuit.

The invention further relates to an installation for implementing the method according to same. Such an installation comprises:

an injection chamber formed by the interior of one of said hollow component and said compartment or said enclosure, a control chamber formed by the interior of the other of said hollow component and said compartment or said enclosure, into which tracer gas was not injected, means for pressurising the interior of said injection chamber, and for injecting a tracer gas into said injection chamber, characterised in that it comprises:

a concentration chamber, means for taking, from said control chamber into said concentration chamber, a sample volume of all or part of the contents of said control chamber, means for concentrating, within said concentration chamber, said sample volume (or "sampled volume");

means for transferring said sample volume from the concentration chamber to a detection chamber comprising means for detecting tracer gas within said concentrated sample volume.

The installation according to the invention can further comprise means for mixing the contents of the control chamber included in the group comprising:

means for the flash expansion and/or re-compression of the contents of the control chamber;

dynamic mixing means formed by means such as an internal fan and/or a turbine external to said chamber;

static mixing means formed by a conformation of the internal surface of said chamber.

The expected effects of these different mixing means have been described hereinabove with regard to the implementation of the invention.

Advantageously, the sampling and concentration means are formed by a pneumatic pump unit.

According to the first embodiment principle, said means for transferring said sample volume are formed by a conveying circuit comprising non-selective restrictor means, said means for detecting said tracer gas being located downstream of said non-selective restrictor.

According to the second embodiment principle, said transfer means are formed by a conveying circuit comprising selective restrictor means, formed, for example, by a membrane filtering unit comprising at least one filtering membrane, said means for detecting said tracer gas being located downstream of said membrane filtering unit.

The detection means include a tracer gas detector which could in particular include a chemical sensor, a heat-sensitive sensor, an ion-pump sensor, or a spectrometer, etc.

The restrictor and/or the membrane filtering unit are in particular designed so as to provide the tracer gas detection means with a sufficiently pressurised gas flow, for a sufficient duration, to allow for the detection operation, typically by generating a pressure difference at the terminals of the detection means.

In the case where a membrane filtering unit is used, the unit will further serve to increase the concentration of the tracer gas in order to further facilitate the detection thereof.

For the implementation of the method according to the second alternative embodiment thereof described hereinabove, the installation comprises an enclosure for receiving the hollow component.

Said membrane filtering unit potentially includes at least two membranes mounted in cascade.

BRIEF DESCRIPTION OF THE DRAWINGS

The invention, in addition to the different advantages thereof, will be more easily understood after reading the following description of a plurality of embodiments of the invention, given for illustrative purposes and in no way limiting the scope of the invention, with reference to FIGS. 1 to 4, in which.

DETAILED DESCRIPTION

Figure 1:
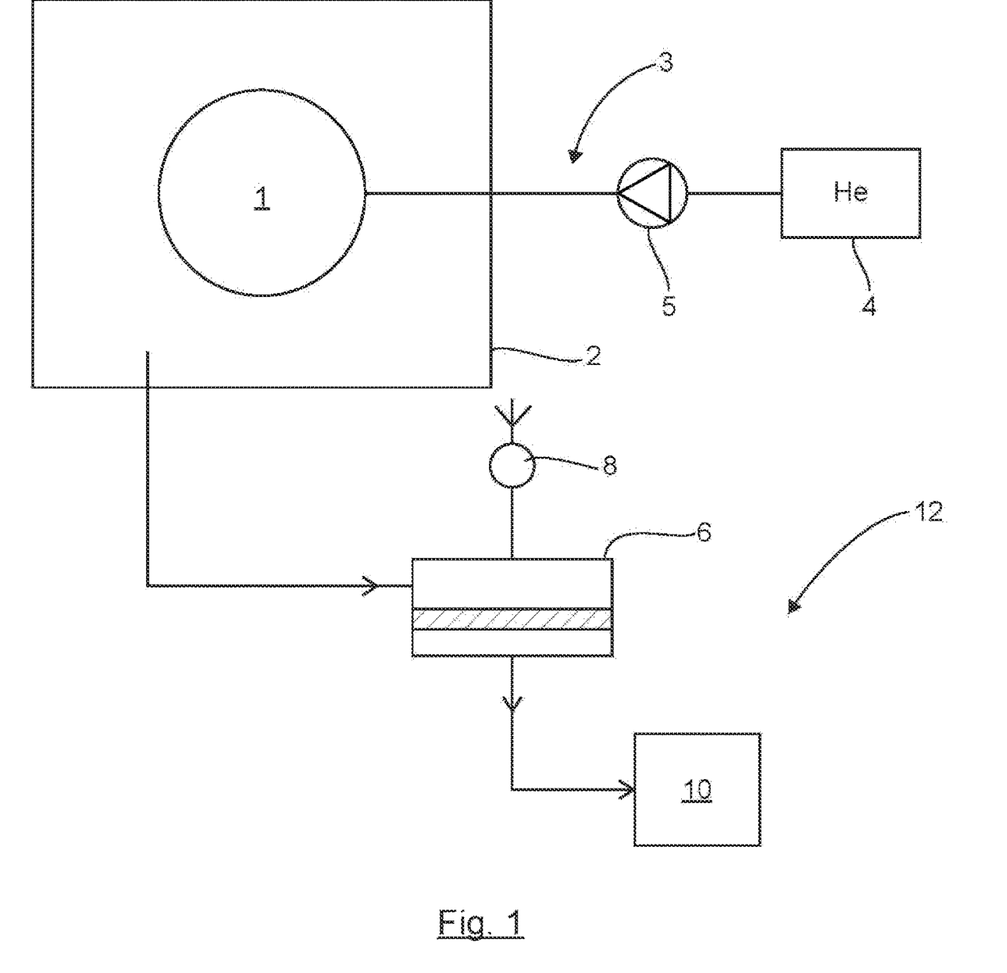
FIGS. 1 and 2 diagrammatically show two examples of leakage detection installations according to the invention, within the scope of the implementation of the second embodiment principle of the invention with the membrane filtering unit.

Description of a First Example Embodiment of an Installation According to the Invention With reference to FIG. 1, the installation for detecting a leakage in a component 1 comprises a compartment 2 forming an enclosure, in which a component 1 to be tested can be disposed after having been sealed, i.e. after having hermetically closed off all of the openings thereof. In the present example embodiment, the compartment 2 has a volume external to the component 1 measuring 300 cc.

This installation further comprises means 3 for injecting a tracer gas, for example helium, into the internal volume of the component 1, in order to pressurise this volume at a pressure P1 of said tracer gas. These injection means include a tank 4 of pressurised tracer gas at a higher pressure and a regulator 5.

A membrane filtering unit 12 including a membrane 6 is connected to the interior of the compartment 2 forming the enclosure. This filtering unit includes a cylinder pump 8. The pump 8 allows the gas contained in the compartment 2 to be conveyed in order to be filtered through the membrane 6.

The filtrate from the membrane 6 is then conveyed to a tracer gas detector 10. Within the scope of the present embodiment, the membrane is a Hyflon® AD60X membrane with a selectivity of 50 compared to air, and the detector is a detector that measures thermal conductivity.

When implementing the method, the sealed component 1 is placed inside the compartment forming the enclosure 2 and the internal volume of this component is pressurised at a tracer gas pressure P1 that is greater than atmospheric pressure, and which in practice can be up to 40 bar. The compartment forming the enclosure 2 that contains air is left at atmospheric pressure or at a lower pressure.

After an accumulation time T, the contents of the compartment forming the enclosure 2 is aspirated by Joule expansion and conveyed upstream of the membrane 6. The pump 8 is actuated in order to force these contents through the membrane 6. The detector 10 measures the quantity of tracer gas in the filtrate obtained downstream of the membrane 6.

The relevance of the present invention was confirmed by taking a leak of 0.01 sccm (sccm: cubic centimetre per minute at standard atmospheric pressure and temperature) and an accumulation time T of 1 minute. At the end of this time, the detector measured a helium concentration of 1,650 ppm in the filtrate originating from the membrane 6. In the absence of the membrane device 12, the concentration of the contents of the enclosure after the accumulation time T of one minute would have been 50 times less (Hyflon® AD60X membranes have a selectivity of 50 compared to air), i.e. only 33 ppm and below the detection threshold of the detector used. Thus, the invention allows, by concentrating the contents of the enclosure after a relatively short accumulation time, quantities of tracer gas present therein to be detected, which quantities would be undetectable in the absence of a membrane filtering step.

Figure 2:
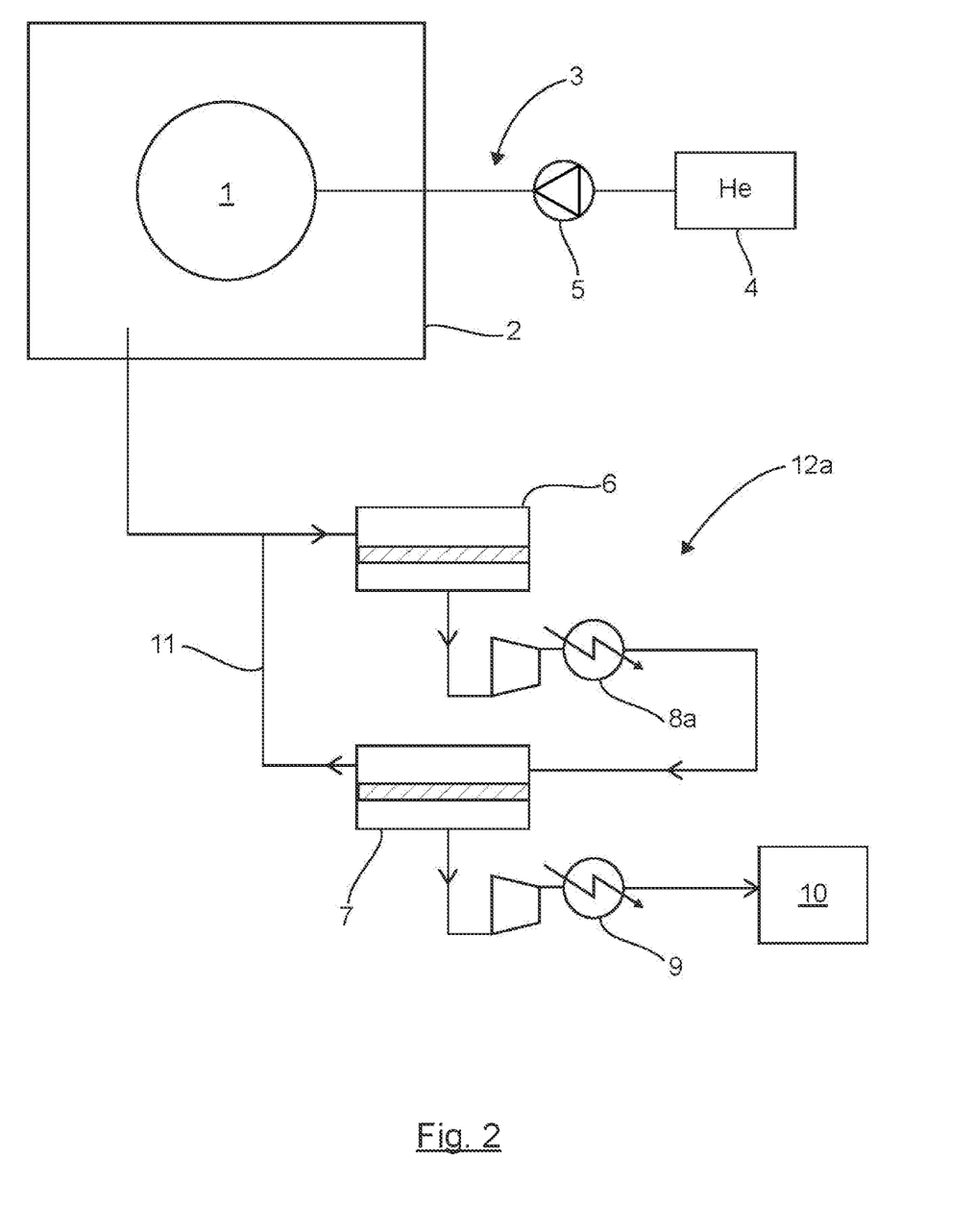

Description of a Second Example Embodiment of an Installation According to the Invention With reference to FIG. 2, this second example embodiment only differs from the first example embodiment described hereinabove in that the membrane filtering unit 12a includes two membranes 6, 7 mounted in cascade and two pumps 8a, 9. The pump 8a allows the gas contained in the compartment 2 to be conveyed before filtering through the membrane 6 and the pump 9 allows the filtrate thus obtained to be conveyed to the membrane 7. The retentate originating from the membrane 7 is recycled upstream of the membrane 6 by a recycling pipe 11. The filtrate from the membrane 7 is then conveyed to a tracer gas detector 10.

(It should be noted that, in another embodiment, the pumps could be provided upstream of the membranes, and not downstream thereof, in order to force the fluid to be filtered therethrough).

Figure 3:
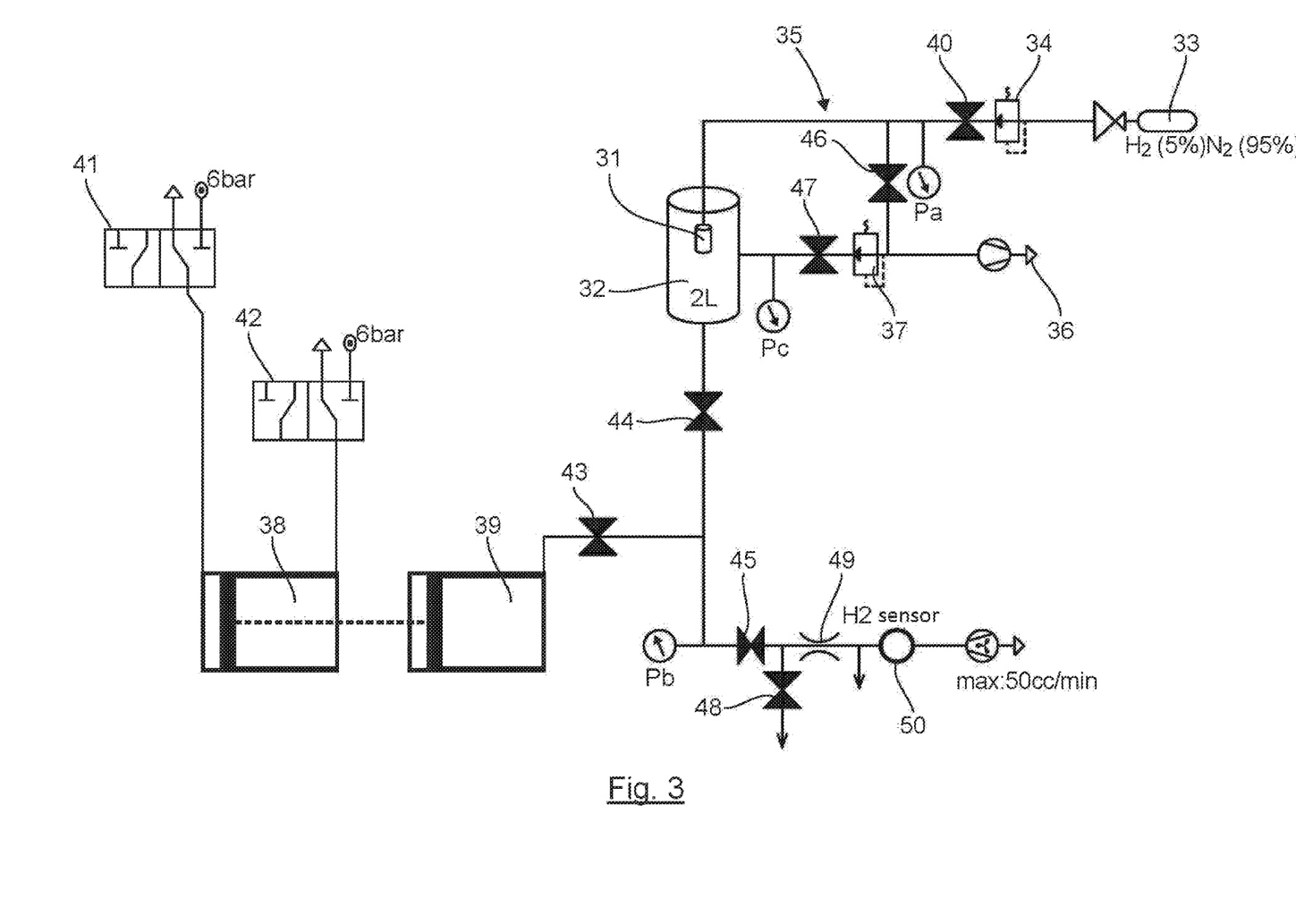
FIGS. 3 and 4 show the successive steps of a preferential method of implementing the invention in a test installation.
Figure 4:
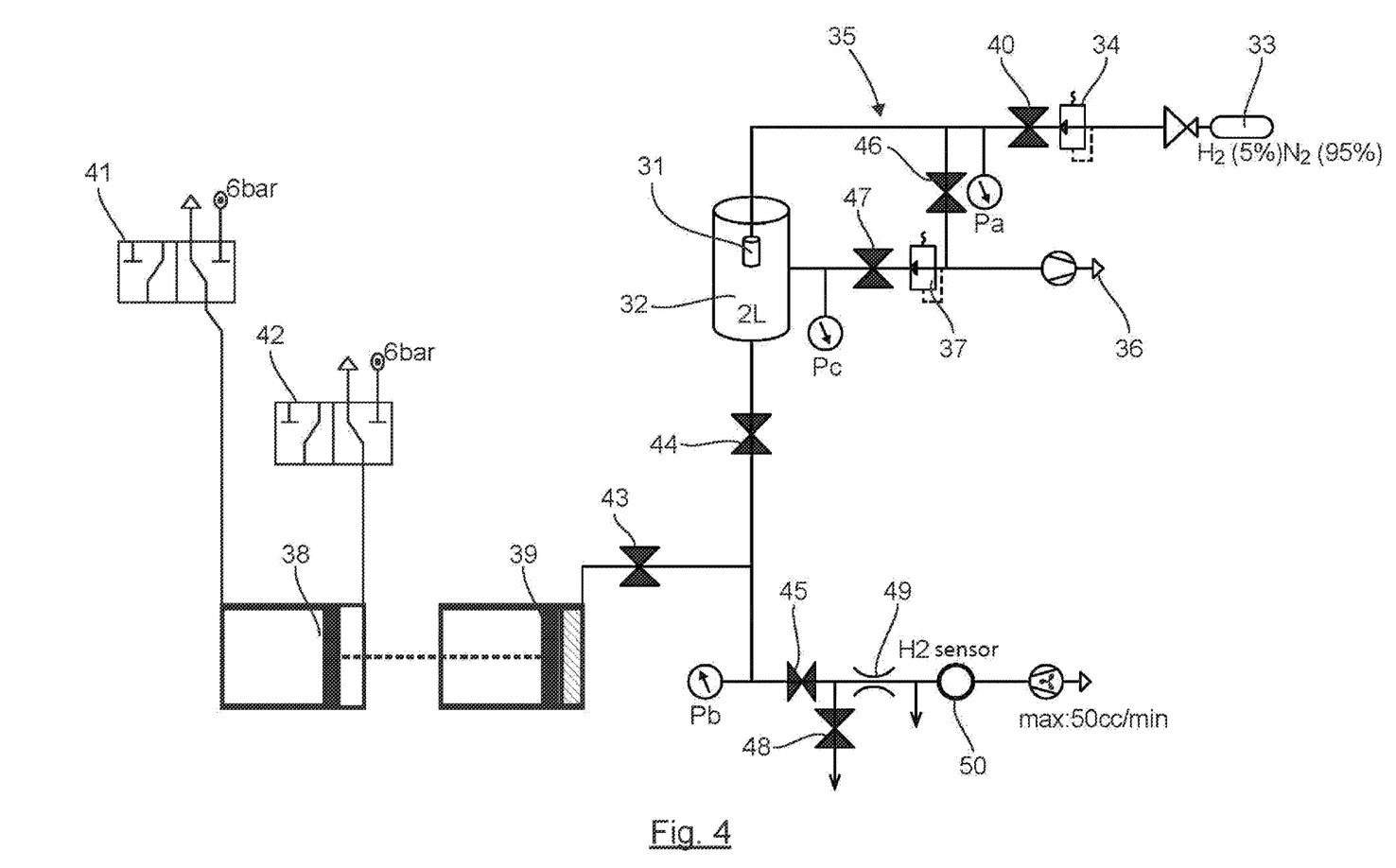

Description of One Example of a Test Installation and of a Method for Implementing the Invention The diagrams provided in FIGS. 3 and 4 show, in a more detailed manner, 5 main steps of implementing the method according to the invention.

These diagrams further correspond to an effective test installation that has confirmed the advantages of the invention.

This test installation was designed to create a leak of 0.062 sccm at 220 kPa of H2N2 (5% H2) leaking into a 2-litre volume.

The concentration principle according to the invention was thus implemented as follows:

if this volume had been at atmospheric pressure, after an accumulation time of 1 minute, a H2 concentration of 5%*0.062/2,000=1.5 ppm would have been observed;

using a lower pressure (8 kPa absolute pressure), and by sampling and re-compressing at atmospheric pressure with the piston system of the installation, a concentration of about 20 ppm is reached.

Yet, since 20 ppm is easier to measure than 1.5 ppm in a reliable manner (given that there is 0.5 ppm H2 in air under normal circumstances), the concentration principle of the invention procures a far better detection and measurement than direct measurement.

More specifically, as will be seen upon examining FIG. 3, which shows the block diagram of the test installation in question, the installation comprises a component to be tested 31, located in a control enclosure 32 which, within the scope of the test, had a volume of 2 litres.

The component to be tested 31, and more specifically the internal chamber thereof acting as an injection chamber, is fed and pressurised by a tracer gas accumulator 33, the tracer gas being composed of 95% N2 and 5% H2.

The pressurised tracer gas injection circuit 35 comprises a pressure reducing valve 34 located upstream of a valve 40, followed by a controlling pressure gauge Pa.

The installation further comprises a circuit 36 for creating a partial vacuum, for example at 8 kPa. The vacuum circuit 36 is connected to the tracer gas injection circuit by a valve 46, and to the control enclosure 32 by a pressure reducing valve 37 and a valve 47.

Downstream of the enclosure 32, a sampling and concentration device comprises a set of two pneumatic spool valves 41, 42 which control a cylinder 38 for actuating a piston 39 (acting as a pump) connected to the enclosure 32 via two valves 43 and 44. The purpose of the pump 39 is to take a sample volume from the enclosure 32, and to re-compress same so as to concentrate it before it is sent to the tracer gas detection means 50.

The concentration operation is carried out in a concentration chamber formed in the circuit downstream of the enclosure 32 and of the valve 44, towards a valve 45 leading to a flow restrictor 49, formed by a non-selective restrictor or to a membrane filtering unit. This selective or non-selective restrictor feeds the tracer gas detection means 50.

In the case of the tests, the element 49 was a restrictor constituted by an orifice of diameter 0.1 mm The method for implementing the invention is carried out in five steps as follows:

STEP 1: CREATION OF A VACUUM in the injection chamber and injection circuit, as well as the control chamber of the enclosure 32 and the circuit downstream of the enclosure 32, the purpose whereof is to act as a concentration chamber. Vacuum creation consists of lowering the pressure to about 8 kPa. To achieve this, the valves 43, 44, 46 and 47 are opened, and the spool valve 41 feeds and pressurises the compression chamber of the actuating cylinder 38 which allows the working compartment of the pump 39 to be emptied. The cylinder 38 and the piston of the pump 39 are thus in the position shown in FIG. 4. The valves 45 and 48 are closed. During the tests, the step of creating a vacuum was maintained for 30 seconds.

STEP 2: ACCUMULATION: for this step, which lasted 30 seconds during the tests, the valves 46 and 47 are closed, and the valve 40 is opened in order to allow for pressurisation and injection of tracer gas into the injection chamber of the component to be tested 31. The component to be tested included a test leak of 0.062 sccm at 220 kPa.

STEP 3: EXPANSION AND SAMPLING: this step lasted 5 seconds during the tests. Sampling was carried out by bringing the actuating cylinder 38 into the left-hand position (FIG. 3) so as to fill the working chamber of the pump 39 with the sample volume extracted from the control chamber of the enclosure 32. At this point, during the tests, the absolute pressure in the control chamber fell from 8 kPa to 4.8 kPa.

STEP 4: RE-COMPRESSION: the valve 44 is closed, the spool valve 41 is actuated in order to drive the cylinder 38 to the right and actuate the pressurised pump 39 (back to FIG. 4), and the circuit located between the two valves 44 and 45 forms a re-compression and concentration chamber reaching an absolute pressure value of 140 kPa (a relative pressure value of 40 kPa relative to atmospheric pressure). This step lasted 5 seconds during the tests.

STEP 5: DETECTION: the valves 45 and 48 were opened and the re-compressed sample volume took approximately 15 seconds to flow through the restrictor 49 before the pressure fell to below the pressure required to ensure a sufficient flow rate to the hydrogen sensor 50. It is during these 15 seconds that the detection measurement is carried out.

A plurality of tests were conducted with this test bench, which confirmed the efficacy of concentration by sampling and re-compression in order to measure low quantities of tracer gas, and thus detect small leakages with a standard detector.

It should be noted that an installation similar to that used for these tests can be used to implement the embodiment principle of the invention, with a membrane filtering unit, by substituting a membrane, or a plurality of membranes in cascade, for the restrictor 49.

The membrane 49, in addition to the restrictive function thereof which has the same effect as that of a simple non-selective restrictor, is selective and thus further increases the concentration.

Given that the membrane 49 is typically much more restrictive, the re-compression pressure is preferably higher (for example 6 bar or more) and the downstream sensor 50 preferably operates at a slower flow rate (in the test with the membrane-free restrictor, the operating rate of the sensor is 50 cc/min; with a membrane, it must operate at about 1 cc/min).

According to another advantageous feature of the invention, the method and the installation mix the contents of the control chamber in order to limit or eliminate stationary zones in the gas mixture, and homogenise the control volume, and thus improve the reliability of the detection and measurement of the tracer gas.

One of the means used to ensure such mixing consists of carrying out a flash expansion and/or compression of the contents of the control chamber, of the volume sampled therefrom and/or of the concentration volume.

Flash expansion is procured, for example, thanks to the use of a syringe piston, which is pulled in order to increase the detection volume, resulting in a pressure drop: more specifically, the greater the volume thus added (therefore the greater the pressure drop), the faster the expansion and the better the mixing.

A similar phenomenon can also be obtained during re-compression: the greater the decrease in volume and the greater the pressure rise, the better the mixing.

The invention covers both of the two scenarios (flash expansion or flash re-compression), in addition to the combination thereof in the form of an expansion+re-compression sequence.

As already stipulated, re-compression can be carried out either against a membrane or through a restrictor in the gas detector, or simply in the detection volume (which is thus at the initial pressure thereof), the gas detector thus being in contact with the detection volume, by "sniffing" (aspiration flow rate generated, for example, using a lower pressure on the other side of a restrictor or membrane, or obtained using a fan). In the second case, this forward-return movement of the piston can even be carried out several times during the accumulation time, to improve mixing in the case where the test volume is high compared to the volume of the piston.

The assembly that allows the syringe piston to be used is identical or similar to that shown in FIGS. 3 and 4, where the two cylinders 38, 39 are mechanically linked, that on the left (38) being actuated pneumatically via the spool valves 41, 42, and pulling and pushing the right-hand cylinder 39 which extracts and expels the gas.

The efficacy of this mixing resulting from the piston effect will now be shown by way of two examples.

Example 1: Test Conducted on a Vehicle Transmission Circuit

In this example, the component to be tested has a volume of 2 litres. This is the internal volume of the component to be tested, into which the gas is injected. The gas used is H2N2 (5% hydrogen in 95% nitrogen).

The test pressure was 220 kPa. A calibration leak was simulated with a release rate of 10-3 cc/sec (=0.06 sccm).

The test set-up is that shown in FIGS. 3 and 4. The sample piston volume is 2 litres. The chamber was initially placed under a vacuum at 8 kPa absolute pressure.

After an accumulation time of 30 seconds, the piston was actuated and the absolute pressure fell to 4.8 kPa. Thanks to this flash expansion (carried out over 5 seconds), the pressure fell by about half, which procured an excellent quality of mixing.

The volume of the piston was then isolated from that of the chamber by the closing of valves. The piston was thus closed, compressing the contents thereof into a very small volume: the absolute pressure changed from 4.8 kPa to 140 kPa (greater than atmospheric pressure). This re-compression was also carried out over 5 seconds.

A ratio of 5 s/30 s, i.e. ⅙ was thus observed between the expansion time (or re-compression time) and the accumulation time. Depending on the case at hand, a person skilled in the art could determine which ratio and/or speed (duration) of flash expansion and/or re-compression would allow for efficient mixing.

A pressure variation taking place over a few seconds, for example over less than 10 seconds, preferably over 5 seconds or less, can be considered to constitute a sufficiently fast expansion or re-compression to procure sufficient mixing.

Mixing also results from the turbulence which occurs in the pipe between the test enclosure and the piston, at the time of expansion, then again in the volume of the piston at the time of re-compression.

This small volume has thus been opened via a restrictor limiting the flow rate to a hydrogen detector of the chemical sensor type (low-cost sensor capable of detecting 1 ppm).

Result: with a leakage of about 10-3 cc/sec (=0.06 sccm), a concentration of about 20 ppm is obtained with good repeatability.

Conversely, without using the method of the invention, a leakage of 0.06 cc/min would have given 0.06 cc at the end of one minute, which, with an initial H2 concentration of 5% and in a 2-litre chamber, would have given, if the chamber was at atmospheric pressure, a concentration of: 5%*0.06/2,000=1.5 ppm, with a content that is very poorly distributed in the chamber, which would not have been detectable in a reliable manner by the same chemical sensor.

The increase in concentration is obtained thanks to the degree of the initial vacuum in the chamber and thanks to the necessary re-compression (since the sensor does not operate under a vacuum). Mixing is obtained thanks to the flash expansion phase.

In another example (Example 2), the component to be tested had a volume of about 40 litres. The test chamber also had a volume of about 40 litres. The relative pressure for the test was brought to 5 kPa. Release rate=0.4 cc/min Gas used=helium.

In an installation similar to that shown in FIGS. 3 and 4, the piston had a volume of 2 litres, i.e. significantly less than the test volume.

In this example 2, the control chamber was at atmospheric pressure, since the component could not withstand a high pressure difference, which prevented placement of the chamber under a high vacuum.

The piston was actuated in order to pull from and push back into the chamber multiple times (typically at least 5 or 6 times) throughout the 1-minute accumulation time, so as to obtain high-quality mixing despite the fact that the pressure of the chamber only fluctuated by 5% each time since the piston volume was 20 times smaller than that of the chamber.

The test volume (the chamber) was then opened towards the helium detector (of the spectrometer type) via suction by way of a restrictor.

After one minute, 0.4 cc of helium was present in a 40-litre volume, which represents 0.4/40,000=10 ppm, which is easily detectable.

The homogeneity of the test volume and the repeatability of the measurement were obtained by mixing via a piston.

The mixing effect can also be obtained by using, for example, a turbine to circulate air within the test volume, or a fan inside the test volume.

Figure 5:
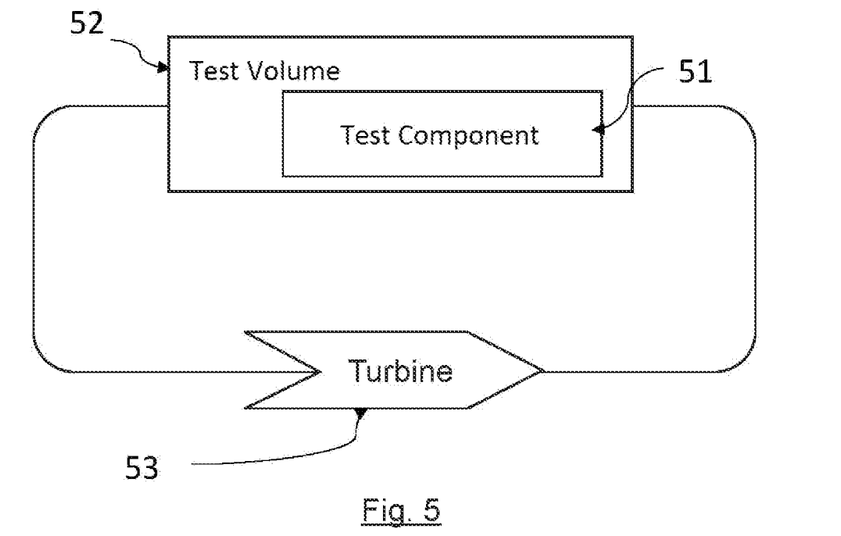
FIGS. 5 and 6 show two embodiments wherein the installation respectively comprises a turbine in order to circulate air within the test volume, or a fan inside the test volume.
Figure 6:
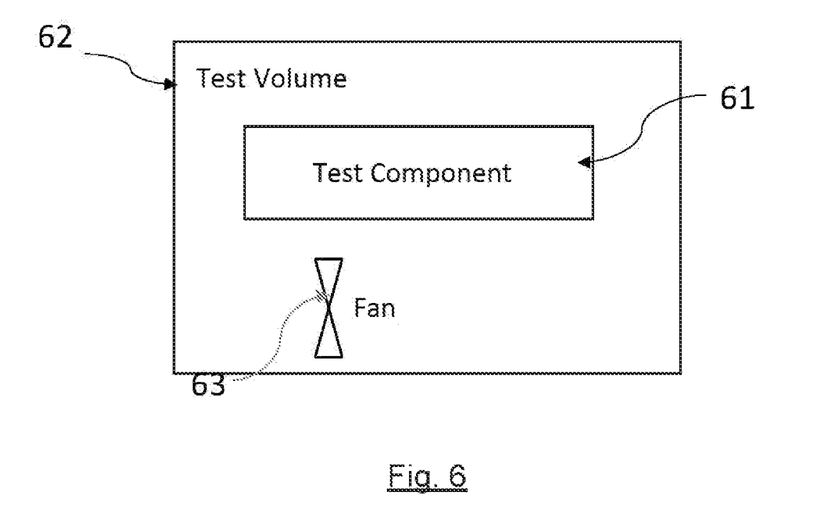

These two solutions are shown in FIGS. 5 and 6 respectively.

FIG. 5 diagrammatically shows the insertion, in the installation, of a turbine 53 external to the test volume, in one embodiment of the invention wherein the component to be tested 51 is placed inside a test enclosure 52. The turbine 53 ensures aspiration of the gas mixture from the test volume to outside the enclosure 52 in order to re-inject same therein again, so as to procure mixing.

FIG. 6 diagrammatically shows the insertion of a fan 63 inside the test enclosure 62 itself, and in which the component to be tested 61 is placed.

However, these mixing means are not as effective as the creation of a flash negative pressure/compression, especially if the geometrical configuration of the component to be tested has corners such that air inside the test volume will remain stationary. The formation of a flash variation in volume and/or pressure, in particular by expansion and/or re-compression further guarantees that no air pocket will remain stationary anywhere.

In order to ease mixing, the inner surface of the test enclosure can have a geometrical configuration that itself has conformations (such as volutes, or others), generating currents and/or movements of air streams aiding the mixing of the test volume.

In all cases, the aim of the installation and of the method according to the invention is to implement a concentration phenomenon using either or both of the following concentrating functions:

on the one hand, the first concentrating function, dependent on the fact that the initial pressure in the enclosure 32 is at a certain level close to a vacuum, relative to atmospheric pressure. Thus, since the pressure in the control chamber of the enclosure has dropped to 8 kPa, there is 12 times less air and thus the hydrogen concentration will be 12 times greater, and thus 12 times "easier" to detect; the expansion and re-compression operation then facilitates detection;

on the other hand, a second concentrating function by enrichment, obtained by using a selective restrictor, for example in the form of a membrane filtering unit, which procures selective concentration downstream of the membrane.

The invention provides for the possibility of using each of these two functions separately, or for combining them together.

It should be noted that, in all cases, the aim is to carry out a detection and/or calibration operation which consists of detecting a leakage rate greater than a given threshold and/or of measuring a known, calibrated leakage and teaching the system that the value measured corresponds to the value of the known calibration leakage.

The invention claimed is:

1. A method for detecting a leakage in a hollow component wherein said hollow component comprises a compartment A and a compartment B adjacent to said compartment A, the method comprising the steps of:
    sealing said hollow component;
    pressurizing, at a pressure P1, a tracer gas within one of said compartment A or said adjacent compartment B after having sealed same;
    pressurizing, at a pressure P2, pressure P2 having a lower pressure value than pressure P1, a different gas within the other of said compartment A or said adjacent compartment B;
    injecting a tracer gas into an injection chamber formed by one of the compartment A or compartment B, the other of the compartment A or compartment B including the different gas than the tracer gas;
    following a waiting of an accumulation time T, sampling at least part of the contents of one of said compartment A or compartment B into which the tracer gas was not injected;
    concentrating in a concentration chamber the sampling in order to concentrate, in a downstream sample volume, the tracer gas potentially contained in one of the compartment A or compartment B into which the tracer gas was not injected; and
    searching for the presence of the tracer gas in said sample volume.

2. A method for detecting a leakage in a hollow component, comprising the steps of:
    sealing said hollow component;
    placing said previously sealed hollow component in an enclosure;
    pressurizing, at a pressure P1, by injecting a tracer gas into an injection chamber formed by an interior of said hollow component;
    pressurizing, at a pressure P2, pressure P2 having a lower pressure value than pressure P1, a different gas than the tracer gas within an interior of said enclosure;
    following a waiting of an accumulation time T, sampling at least part of the contents of the enclosure interior into which the tracer gas was not injected;
    concentrating in a concentration chamber the sampling in order to concentrate, in a downstream sample volume, the tracer gas potentially contained in the enclosure interior into which the tracer gas was not injected;
    transferring through a membrane the sample volume of the contents of said enclosure interior prior to a searching for the presence of the tracer gas downstream of said membrane, wherein the different gas potentially containing the tracer gas is aspirated by Joule expansion and compressed through the membrane; and searching for the presence of the tracer gas in said sample volume.

3. The method according to claim 2, wherein the concentrating the sampling further comprises a sequence comprising:
   a first sub-step of expanding the contents of the enclosure interior in order to feed the concentration chamber with the sample volume; and
   a second sub-step of re-compressing the sample volume in order to ensure a concentration thereof before the step of searching for the presence of the tracer gas within said sample volume.

4. The method according to claim 3, wherein the sequence of expanding the enclosure interior contents and re-compressing the sample volume comprises at least two consecutive sequences of expanding the enclosure interior contents and re-compressing the sample volume.

5. The method according to claim 2 further comprising mixing the contents of said enclosure interior inside the enclosure interior operable to prevent any stationary zone inside said enclosure interior, mixing the contents further comprising one of:
   at least one of flash expanding or flash re-compressing of the contents of the enclosure interior;
   dynamic mixing by one of an internal fan positioned in the enclosure interior or a turbine external to said enclosure in communication with the enclosure interior; or
   static mixing by a conformation of an internal surface of said enclosure.

6. The method according to claim 2, wherein said tracer gas comprises one of: helium, or a mixture of helium or hydrogen in air or nitrogen.

7. The method according to claim 2, wherein said pressure P1 is in the range of 1 bar to 40 bar.

8. The method according to claim 2, wherein the different gas is air.

9. The method according to claim 2, wherein said pressure P2 is less than or equal to atmospheric pressure.

10. The method according to claim 2, wherein the time T is in the range of 30 seconds to 30 minutes.

11. The method according to claim 2, wherein the membrane comprises at least two membranes mounted in cascade.

12. The method according to claim 2, wherein the membrane further comprises one of a polymer membrane or a membrane having a microporous silica base.

* * * * *